April 1, 1941. R. H. ROSENBERG 2,237,163
SHACKLE ARM CONSTRUCTION
Filed June 28, 1940
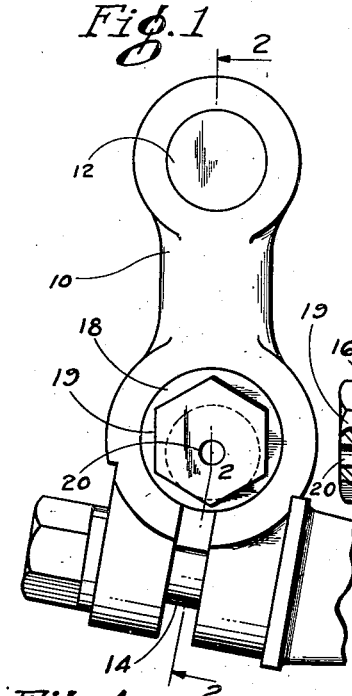
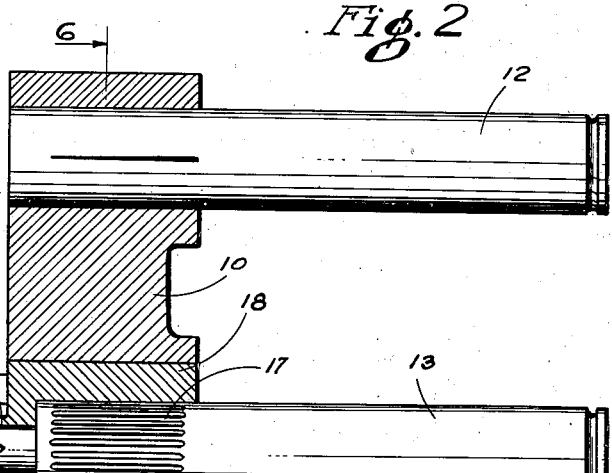
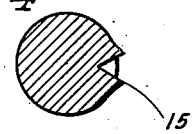
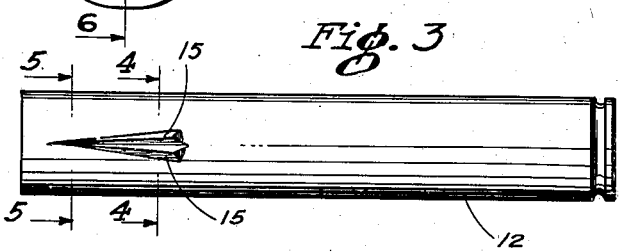
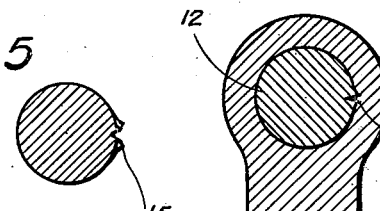
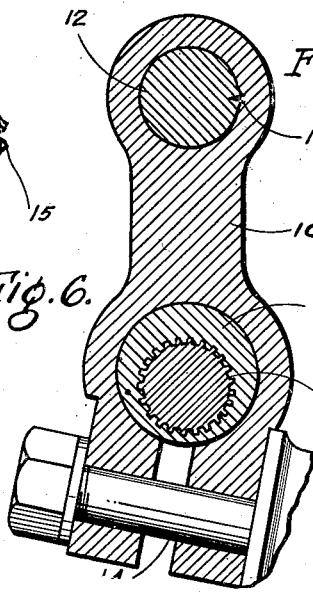
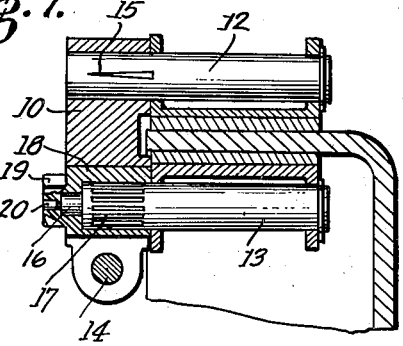
INVENTOR.
RALPH H. ROSENBERG
BY Richey & Watts
ATTORNEYS.

Patented Apr. 1, 1941

2,237,163

UNITED STATES PATENT OFFICE 2,237,163

SHACKLE ARM CONSTRUCTION

Ralph H. Rosenberg, Detroit, Mich., assignor to Detroit Duo-Grip Brake Company, Detroit, Mich., a corporation of Michigan Application June 28, 1940, Serial No. 342,986

2 Claims. (Cl. 188—79.5)

This invention relates broadly to shackles and more specifically to improvements therein which are primarily adapted for use in brake actuating mechanisms.

One of the objects of the invention is to construct a composite shackle embodying an arm having a pair of pintles secured therein normal thereto, one of which is adapted for adjustment toward the other.

In detail the structure comprehends the provision of an eccentric pin secured in one end of the arm and adapted to be clamped therein so that the brake member supported thereon may be adjusted in compensation of wear.

The invention further comprehends a pin embodying an eccentric die cast head which is formed to accommodate the use of a wrench for adjusting the eccentric within the bearing member associated therewith.

Another object of the invention is to provide a tapered longitudinal spur in the body of a pin to facilitate the rigid securement thereof in the bore of the arm within which the pin is pressed during assembly.

Another object of the invention is to provide a brake shoe shackle which is economic of manufacture, rigid of structure and adapted to facilitate the ready adjustment of the brake shoes supported thereon.

Other objects and advantages more or less ancillary to the foregoing and the manner in which all the various objects are realized will appear in the following description, which considered in connection with the accompanying drawing, sets forth the preferred embodiment of the invention.

Referring to the drawing wherein the preferred embodiment of the invention is illustrated;

Fig. 1 is a front elevational view of the connecting shackle arm showing the eccentric cam portion therein and clamping member therefor;

Fig. 2 is a vertical sectional view of the arm and pins in their assembled relation, the section being taken on a plane indicated by line 2—2 of Fig. 1;

Fig. 3 is a plan view of one of the pins illustrating the form of the tapered spur before the pin is pressed into the opening in the arm;

Fig. 4 is a transverse, sectional view of the pin illustrated in Fig. 3, the section being taken on a plane indicated by the line 4—4 of Fig. 3;

Fig. 5 is a transverse sectional view of the pin illustrated in Fig. 3, the section being taken on a plane indicated by the line 5—5 of Fig. 3;

Fig. 6 is a vertical sectional view through the assembly showing the assembled relation of the pins within the arm and the pin clamping mechanism, the section being taken on a plane indicated by the line 6—6 of Fig. 2; and Fig. 7 is a sectional view of a fragmentary portion of a brake drum showing the assembled relation of the internal and external brake shoes.

Referring to Figs. 1 and 2, the improved shackle comprises an arm 10 having openings formed in the opposite ends thereof for the reception of pins 12 and 13 adapted in the present case for the support of the internal and external brake shoes, not shown, of a brake mechanism. The lower portion of the arm 10 is formed with a split boss drilled to receive a clamping bolt 14, or as illustrated herein, the threaded shank of the end portion of a brake actuating lever.

The pin 12 which is secured in the opening formed in the upper portion of the arm 10 is swaged to form a pair of tapered spurs 15, tapered in relation to the medial axis of the pin and in a common plane therewith.

The spurs or ribs 15 are preferably formed by forcing a plunger into the body of the stock, the configuration of the metal displaced in such operation being determined by the shape of the tool and depth of the rupture in the stock. The pin is turned before deformation of the surface thereof for a press fit within the opening in the arm, the spur, due to the relative hardness of the steel, cutting its own keyway in the arm as it is forced into the opening.

The pin 13 is formed with a reduced end portion 16 and a serrated end portion 17 adjacent thereto which is provided for the retention of an eccentric collar 18 cast in place thereon.

The method preferably employed in the production of the pin 13 contemplates the use of a fixture having a cavity thereon, constituting the mold for the collar 18 and the hexagonal boss 19 formed on the end thereof. The pin 13 is supported in the fixture with the reduced end portion 16 thereof engaged with and supported by a retractable centering pin disposed, as shown by the imprint 20 in Fig. 2, in the medial axis of pin 13. Although the boss 19 illustrated herein is of hexagonal form, it will be recognized that other types of wrench couplings may be substituted therefor without departing from the spirit of the invention.

As will be seen in Fig. 6, the eccentric collar 18 is clamped within the split end of the arm 10, the loads borne thereby being only such lateral or compressive strains as are imposed through the pin. Thus though the collar is cast from a material of relatively low tensile strength, such as white metal, the efficiency of the casting is adequate for the office of the part, since the collar is compressively supported within the bore in the arm and subjected only to the compressive strains transmitted through the pin.

In use of the improved shackle adjustment of one of the pins toward and away from the other may be effected by release of the clamping bolt 14, rotation of the collar 18 to the desired position and readjustment of the bolt 14 into clamping engagement with the collar. It will be noted such adjustment may be effected from the outer face of the arm without removal of the members carried by the pins or any other alteration thereof. Thus in a vehicular brake where the brake shoes are carried by the pins the shoes may be adjusted toward each other, compensative of wear of the lining without removal of the shoes or the appurtenances customarily coordinated therewith.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A fork comprising, a link and parallel pins mounted therein, said link having an opening and a split boss formed in opposite ends thereof, one of said pins having a tapered burr formed therein, said burr being compressed and imbedded in the link as the pin is pressed in the opening therein, the other of said pins having serrations formed therein adjacent an end thereof, an eccentric member die cast on the serrated end of said pin, and means coacting with said split boss to adjustably clamp said eccentric member therein.

2. In a brake mechanism embodying internal and external brake shoes, a shackle therefor comprising, a link having openings in opposite ends thereof, pins mounted in said openings for the support of said shoes, a tapered burr formed in one of said pins for rigidly securing said pin in an opening in the link, serrations formed in the other pin, an eccentric member die cast about said serrations, a split boss in said link and means in said boss for clamping the eccentric member in said link.

RALPH H. ROSENBERG.